Figure 1:
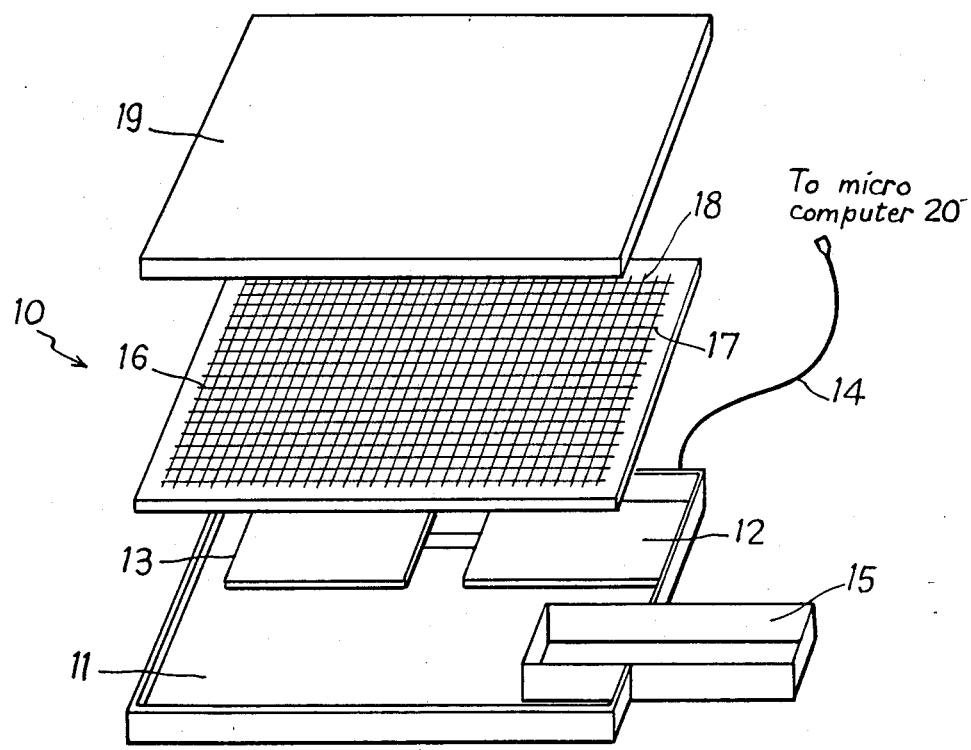

United States Patent [19]

Farel et al.

[11] Patent Number: 4,697,050
[45] Date of Patent: Sep. 29, 1987

[54] DEVICE FOR DIGITALIZING GRAPHICAL DATA

[75] Inventors: Alain Farel, 2, allée des Coquelicots, 78630 Orgeval; Manuel Agobian, Pontcarre; Sinh Le, Maisons Alfort, all of France

[73] Assignee: Alain Farel, Oregval, France

[21] Appl. No.: 883,312

[22] Filed: Jul. 8, 1986

[30] Foreign Application Priority Data

Jul. 9, 1985 [FR] France .................. 85 10508

[51] Int. Cl.$^4$ .................................. G08C 21/00
[52] U.S. Cl. ................................... 178/18; 178/19
[58] Field of Search ................. 178/18, 19, 20; 340/701, 706; 324/207

[56] References Cited

U.S. PATENT DOCUMENTS

| | | | |
|---|---|---|---|
| 3,761,620 | 9/1973 | Graven | 178/18 |
| 4,185,165 | 1/1980 | Fencl | 178/19 |
| 4,205,199 | 5/1980 | Mochizuki | 178/19 |
| 4,430,526 | 2/1984 | Brown et al. | 178/18 |
| 4,638,119 | 1/1987 | Blesser et al. | 178/19 |

FOREIGN PATENT DOCUMENTS 0134539 2/1984 European Pat. Off.
2024435 7/1979 United Kingdom.

OTHER PUBLICATIONS

IBM Technical Disclosure Bulletin, vol. 3, No. 6, Nov. 1960, p. 22.
Patent Abstracts of Japan, vol. 4, No. 153, (p. 33), [635], Oct. 25, 1980 (pp. 7, 33).

*Primary Examiner*—Stafford D. Schreyer
*Attorney, Agent, or Firm*—Lowe Price Leblanc Becker & Shur

[57] ABSTRACT

The invention relates to a device for simultaneously effecting on the one hand, the plotting or erasing of graphical data on a material medium and, on the other hand, the recording or erasing of corresponding data in a computer memory. Write and/or erase means in the form of one or more pens comprise: write and/or erase members for selectively producing visible plottings or effective erasings on a drawing table; means for generating a magnetic field having a frequency corresponding to the selected write or erase function; and electrical supply means permitting the or each pen to be self-operating. The table comprises detection and computing circuits for working out from signals received on the conductors of the grid, data which is representative of the position of the pen with respect to the table, and data representative of the selected write or erase function.

6 Claims, 5 Drawing Figures

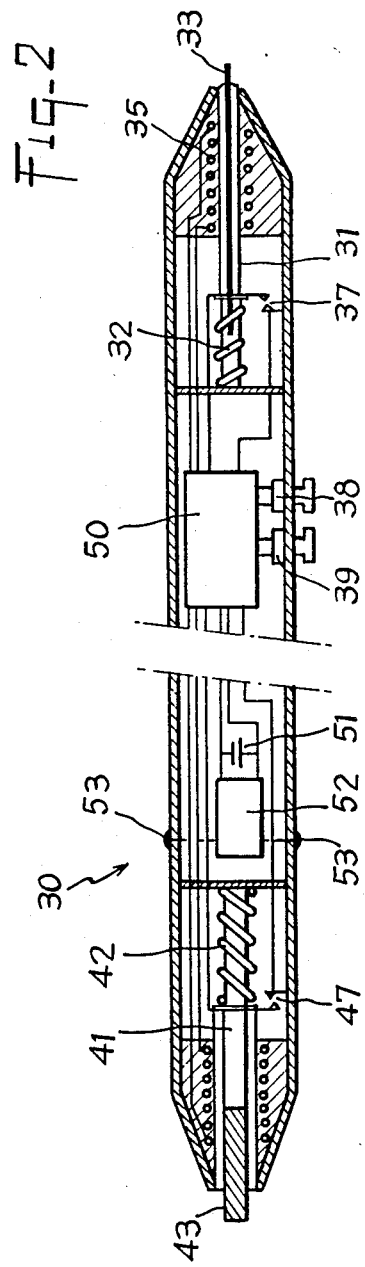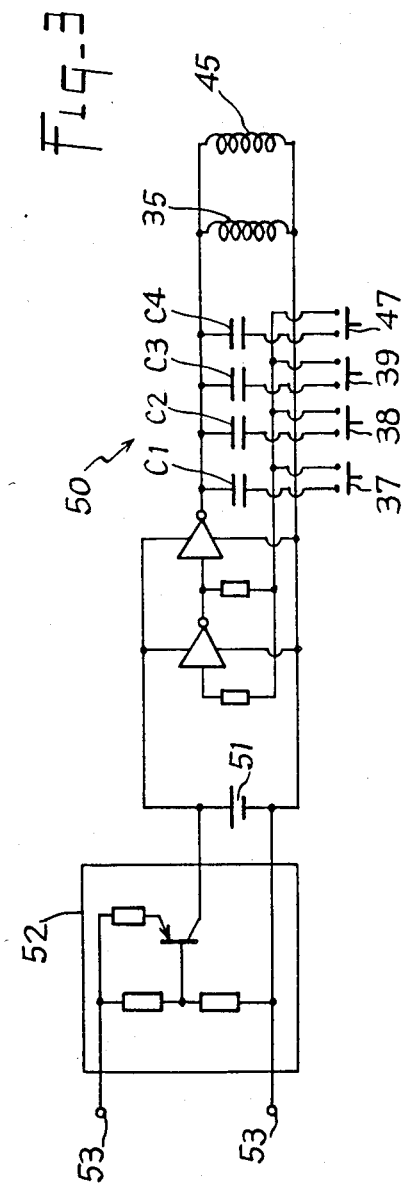

DEVICE FOR DIGITALIZING GRAPHICAL DATA

The present invention relates to a device for digitalizing graphical data, and more particularly a device permitting the digital conversion and recording of graphical data such as drawings, at the time of their creation.

The known devices permitting the digitalization of graphical data when these are being created, use light pens, electrostatic or electromagnetic pens or mice working on digitalizing tables without leaving any graphical trace on any type of carrier.

The user cannot then let his creativity run freely since his working method is hampered by the difference which exists between inputting data via the digitalizing table and the visible image of the graphic displayed on the screen or on a plotter. It is moreover difficult to work with a mice-type object which does not correspond to the design of the conventional drawing tools.

It is the object of the present invention to provide a device for digitalizing graphical data while enabling the draftsman to work in the normal conditions of his activity, and in particular, giving him the possibility of making visible plottings or effective erasings while recording or erasing the corresponding digital data in or from a computer memory.

This object is reached with a device which, according to the invention, comprises:

a drawing table incorporating a grid formed by a first assembly of conductors arranged in lines, and a second assembly of conductors arranged in columns;

write or erase means, comprising: write or erase members for selectively performing visible plottings or effective erasings on the drawing table; means for generating magnetic fields having different predetermined characteristics, each magnetic field corresponding to a respective one of the write or erase functions which can be performed, the generated magnetic field being determined according to the selected write or erase function, and electric supply means to enable the self-operation of the write or erase means, and a detection and computing circuit, connected to the conductors of the grid to receive the signals induced in said conductors by the generated magnetic field and comprising processing means for working out a position data representing the position of the write or erase member used, with respect to the drawing table, and to differentiate, from the signals received on the conductors of the grid, the various magnetic fields, one from the other, so as to combine the data representing the selected write or erase function which has been selected with the position data.

The different characteristics of the generated magnetic fields may be their amplitude and/or frequencies, which, in the conductors of the grid, result in induced voltages of different intensities. The processing means are then so arranged as to detect the maximum amplitude of the signals received on the conductors of the grid and to compare said maximum amplitude with pre-set values defining different ranges of amplitude, each one corresponding to a particular amplitude or frequency of the magnetic field, so as to deliver said data representing the selected write or erase function.

According to one particular feature of the digitalizing device, the write or erase means comprise at least one retractable write or erase member, optionally coupled to a switch controlling the generating of a magnetic field by closure of said switch under the effect of the pressure exerted by the write or erase member on the drawing table.

Figure 4:
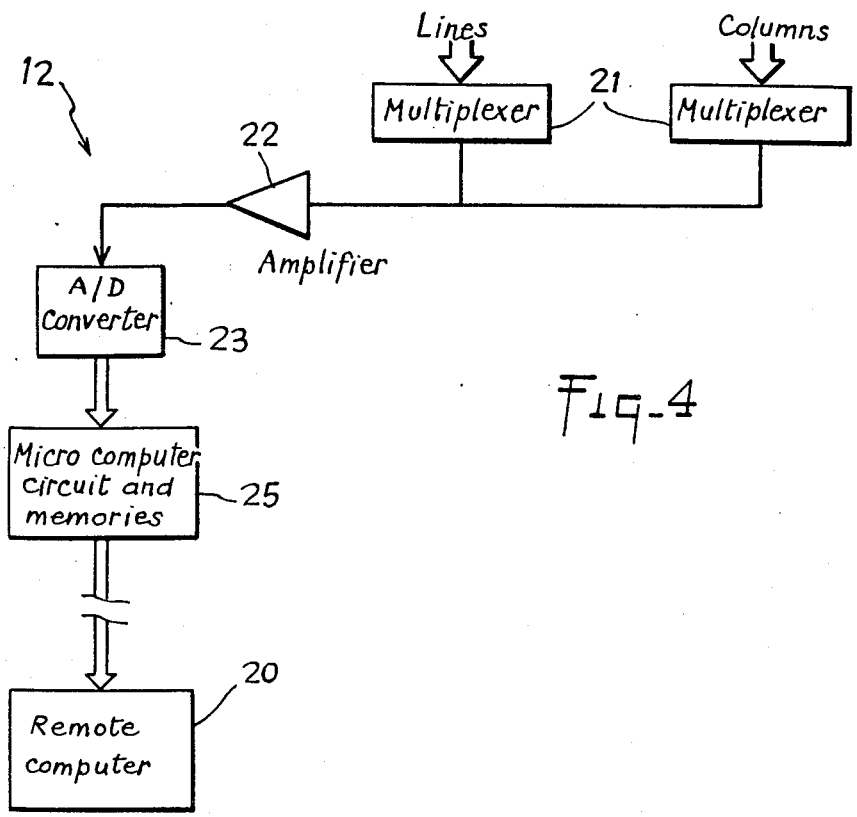
Figure 5:
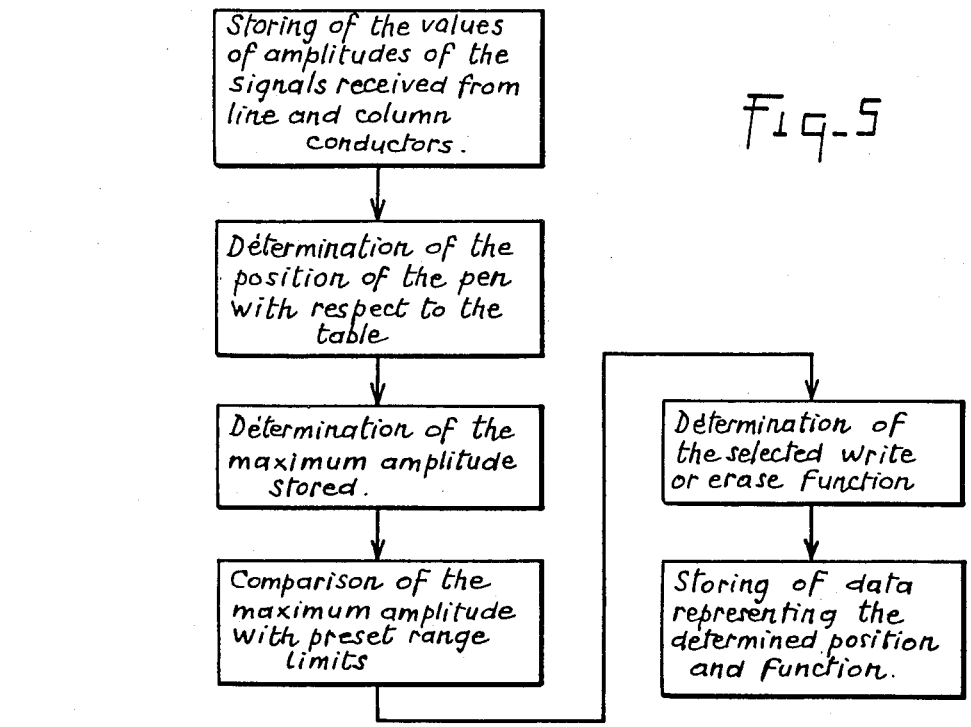

The invention will be more readily understood on reading the following description, with reference to the accompanying drawings, in which:

FIG. 1 is an exploded diagram of one embodiment of drawing table of the digitalizing device according to the invention, FIG. 2 is a very diagrammatical view of one embodiment of a pen usable with the table of FIG. 1, FIG. 3 is a diagram of the circuits contained in the pen shown in FIG. 2, FIG. 4 is a diagram of the circuits contained in the table of the digitalizing device; and FIG. 5 is a block diagram showing the operations carried out during the processing of the signals received on the conductors of the grid of the table of the digitalizing device.

The drawing table 10 illlustrated in FIG. 1 comprises a base 11 of adjustable inclination, on which is placed a digitalizing grid 16 which grid is in turn covered with a coating plate or layer 19.

The base 11 contains electronic circuits 12 for processing the signals received from the digitalizing grid and an electric supply circuit 13. A connection 14 connects the circuit 12 to a micro-computer 20 to which can be transferred the digitalized graphical data. The connection between the plotter 10 and the micro-computer 20 is achieved by any known type of connecting means, such as for example a parallel-type or series connection using conductors or optical or sound transmission means. Base 11 further comprises a drawer 15 for storing the different pens.

Grid 16 is formed, in known manner, by a square-mesh network of rectilinear conductors 17 which are parallel to each other and arranged in lines and of rectilinear conductors 18 which are parallel one to the other and arranged in columns. The number of line conductors and of column conductors may be for example, equal to 64. Said conductors 17, 18 are individually connected to circuits 12 via flexible connections (not shown).

The coating 19 is in a material which is permeable to magnetic fields, such as for example, a plastic material. Its upper face is used as a plotting medium, or for supporting such a medium, namely a paper, tracing paper, plastic film or the like.

Plotting of graphics on the coating 19 is performed with a pen such as 30 shown in FIG. 2.

At one first end, said pen 30 comprises a writing member such as an ink-pen, or as in the illustrated example, a lead pencil 31. Said lead pencil 31 is retractable against the restoring force exerted by a spring 32. Conventionally, the lead pencil 31 can be operationally coupled to means of propelling the lead 33 forward as said lead gradually wears out.

The pen 30 further comprises, at its first end, an induction coil 35 surrounding the lead 33 and which is connected to an oscillator circuit 50. A switch 37 has a movable contact fixed to the lead-pencil 31 and a fixed contact carried by the body of pen 30. When using the pen in writing mode on table 10 via lead 33, the pressure exerted on the lead point during the write operation closes the switch 37 against the restoring force exerted by spring 32. As indicated hereinafter, switch 37 is inserted in oscillator circuit 50 so that the closure of switch 37 controls the operation of said oscillator at a frequency corresponding to a write function.

One or more other switches, two in the illustrated example, 38,39 are inserted in the oscillator circuit and can be operated by hand via operative tips provided on the body of pen 30. The actuating of either one or both switches 38,39 modifies the frequency of the oscillator as a function of one particularly selected writing mode, for example as a function of a particular colour or graphic (lines of different thickness, or dashes or dots for example). Corresponding colour or graphic reference marks are then formed on the operative tips of the switches or on the pen body, opposite said operative tips. The switches can, as a variant, be controlled by a single operative tip with several positions corresponding to the different marks formed on the pen body. The selection of one writing colour via switches 38,39 can be performed with a change of the writing member in order to reproduce on the drawing table a visible plotting which corresponds exactly to the digitalized data. It is possible to this effect, to change lead 33 of lead pencil 31.

Pen 30 is provided at its other end with an erasing member such as a rubber-holder 41 which is retractable against the action of a spring 42. An inductor coil 45 surrounds the rubber 43 and is connected to oscillator 50. A switch 47 has a movable contact fixed to the rubber-holder 41 and a fixed contact carried by the body of pen 30. When the pen 30 is used in erasing mode to erase a plotting, made on drawing-table 10, with rubber 43, the pressure exerted on said rubber during the erasing operation closes the switch 47 against the restoring force exerted by the spring 42. Said switch 47 is inserted in the oscillator circuit 50 so that the closure of switch 47 controls the operation at a frequency corresponding to the erasing function.

The electric supply of the oscillator is achieved by a rechargeable battery 51, such as an Ni-Cd battery. Said battery is connected to a charge circuit 52 which can be connected to an external voltage source by means of terminals 53 provided on the body of the pen. Thus, pen 30 can be self-operating, without any physical connection with any external voltage source or with the plotter 10.

The electrical circuits contained in pen 30 are illustrated in FIG. 3.

Oscillator circuit 50 comprises a plurality of different capacitors C1 to C4 which are switched on by turning on switches 37, 38, 39 and 47, respectively. The magnetic field produced by coil 25 or coil 45 thus has a frequency which is dependent on the operating mode selected by the closure of one or more switches.

The case considered hereinabove has been that of a single pen re-grouping different functions of writing and erasing. It is also possible to use several multifunction pens, or even several one-function pens. In this latter case, each pen is equipped with a particular write or erase member and comprises an oscillator circuit working at a different frequency than that of the oscillators of the other pens. Generating of the magnetic field is controlled by the closure of a switch due to the pressure exerted on the table by the write or erase member.

Compared to the digitalizing tables known heretofore, table 10 works differently in that, on the one hand, plottings and erasings are effectively carried out on the table and, on the other hand, in addition to the position data giving the coordinates of instant positioning of the pen with respect to the grid, another data is worked out, which represents the plotting or erase function selected by the user. Said function data is determined by identifying the frequency of the magnetic field produced by the pen, from signals received on the conductors of the grid.

FIG. 4 diagrammatically illustrates the electronic circuits 12 contained in the table 10. The conductors 17, 18 are sequentially selected via analog multiplexers 21 of which the output signals are amplified by amplifier means 22. The amplified signals are converted to digital form by an analog-to-digital converted circuit 23 and the digital signals are stored in memories 24. Said signals are processed by a micro-computer 25. The different processing steps are illustrated in the block diagram of FIG. 5.

The data relative to the position of pen 30 is determined by detecting the maximum current amplitude received by the line conductors and the column conductors and by converting said maximum value in coordinate values. A detailed description of how to determine the position data will not be required here since it is the same as the methods conventionally used with digitalizing tables.

According to the invention, the processing of the received signals further involves determining the data representing the selected plotting or erase function. Such determination is quite simply achieved by comparing the maximum value detected, with various pre-set values defining the limits of different ranges of amplitude, each one corresponding to one particular frequency of the magnetic field. Indeed, the generating of magnetic fields of different frequencies causes the production on the grid conductors of signals of different amplitudes. Therefore, the detection of the maximum amplitude and its comparison with said pre-set values enables the identification of the frequency of the field, hence the selected write or erase function.

Once determined, the function data is combined with the position data and the two are recorded in memories 24. The recorded data can then be transmitted to a micro-computer 20 via connection 14, in order to clear some memory space in the memories 24 for digitalizing new graphical data.

It is also possible to provide table 10 with a removable non volatile memory means such as an electronic integrated memory circuit, a cassette or a floppy disk, to record the graphical data. The provision of a particular connection between table 10 and micro-computer 20 is then not necessary.

We claim:

1. Device for digitalizing graphical data at the time of their creation, comprising:
  a drawing table incorporating a grid formed by a first assembly of conductors arranged in lines, and a second assembly of conductors arranged in columns;
  write or erase means, comprising: write or erase members for selectively performing visible plottings or effective erasings on the drawing table; means for generating magnetic fields having different predetermined characteristics, each magnetic field corresponding to a respective one of the write or erase functions which can be performed, the generated magnetic field being determined according to the selected write or erase function, and electric supply means to enable the self-operation of the write or erase means, and
  a detection and computing circuit, connected to the conductors of the grid to receive the signals induced in said conductors by the generated magnetic field and comprising processing means for working out a position data representing the position of the write or erase member used, with respect to the drawing table, and to differentiate, from the signals received on the conductors of the grid, the various magnetic fields, one from the other, so as to combine the data representing the selected write or erase functions which has been selected with the position data.

2. Device as claimed in claim 1, wherein the generated magnetic fields have different frequencies, each one corresponding to one of the write or erase functions.

3. Device as claimed in claim 2, wherein the processing means are so arranged as to detect the maximum amplitude of the signals received on the conductors of the grid and to compare said maximum amplitude with preset values defining different ranges of amplitude, each one corresponding to a particular frequency of the magnetic field, so as to deliver said data representing the selected write or erase function.

4. Device as claimed in claim 2, wherein the write or erase means comprise at least one pen usable with various write or erase members, said pen comprising an oscillator circuit of adjustable frequency, an induction coil connected to the oscillator, and means for adjusting the oscillator frequency as a function of the selected write or erase function.

5. Device according to claim 4, wherein said adjusting means comprise at least one hand-operable switch provided on the pen.

6. Device as claimed in claim 1, wherein the write or erase means comprise at least one retractable write or erase member, operationally coupled to a switch controlling the operation of a magnetic field by closure of said switch under the effect of the pressure exerted by the write or erase member on the drawing table.

* * * * *